United States Patent [19]

Petty

[11] Patent Number: 5,174,845
[45] Date of Patent: Dec. 29, 1992

[54] INSULATION WRAPPING STRIP WITH VARIABLE CONFIGURATION

[75] Inventor: Phillip C. Petty, Brigham City, Utah
[73] Assignee: Thiokol Corporation, Ogden, Utah
[21] Appl. No.: 732,151
[22] Filed: Jul. 18, 1991

Related U.S. Application Data

[62] Division of Ser. No. 523,000, May 14, 1990, Pat. No. 5,098,277.

[51] Int. Cl.⁵ .............................................. B32B 31/00
[52] U.S. Cl. ..................... 156/184; 156/195; 156/244.13; 156/244.15; 156/501; 425/363; 425/367
[58] Field of Search ........... 156/143, 144, 195, 244.13, 156/244.15, 397, 425, 446, 501, 502, 500, 110.1; 264/175; 425/366, 367, 368, 363, 184

[56] References Cited

U.S. PATENT DOCUMENTS

| | | | |
|---|---|---|---|
| 3,066,063 | 11/1962 | Ecklund et al. | 156/244.13 |
| 3,570,054 | 3/1971 | Seanor et al. | 425/367 |
| 4,028,035 | 6/1977 | Komarek | 425/367 |
| 4,272,471 | 6/1981 | Walker | 264/175 |
| 4,348,952 | 9/1982 | Gooch | 425/366 |
| 5,007,343 | 4/1991 | Marks | 156/173 |

Primary Examiner—David A. Simmons
Assistant Examiner—James J. Engel, Jr.
Attorney, Agent, or Firm—Madson & Metcalf

[57] ABSTRACT

The insulating coating for an object such as a rocket motor casing is formed by wrapping a strip of insulating material upon the surface of a rotating mandrel. By means of this invention, it is possible to wrap a strip of malleable material such as rubber from an extruder onto a complex shape while exercising precise thickness control, thereby eliminating the need for machining the outer surface. The strip is run through a forming mill of unique construction which shapes the strip during the wrapping process to conform most precisely with the topography of the mandrel. The mill automatically varies both the taper and the width of the strip. The final wrapped product has a smooth outer surface that requires minimal finishing.

4 Claims, 2 Drawing Sheets

INSULATION WRAPPING STRIP WITH VARIABLE CONFIGURATION

This is a divisional of copending application(s) Ser. No. 07/523,000 filed on May 14, 1991, now U.S. Pat. No. 5,098,277.

TECHNICAL FIELD

This invention relates to the formation of objects by strip wrapping. More particularly, it relates to the wrapping of a strip of insulating material, such as rubber, upon a rotating component or mandrel having a rounded or tapered surface.

BACKGROUND ART

Rocket motor casings are conventionally provided with an inner or outer heat insulating surface such as rubber. It has been proposed to adapt rubber extruder and wrapping equipment developed for the large tire fabrication industry to the construction of rocket motor insulators. The general concept of forming such components by wrapping is not new. The advantage of this approach is that the extruder would provide freshly mixed, hot, uncured rubber. When hot the rubber is tacky and is more readily processed than the same material in calendered form at room temperature. The invention disclosed herein is unique because it employs a modified roll mill which configures the extruded rubber strip to the final shape required for wrapping.

The prior art wrapping system referred to above employs a two roll mill in conjunction with the extruder. The mill puts the finishing touches on the shape of the extruded strip of uncured rubber prior to wrapping. The final strip shape which is produced is fixed and cannot be changed without shutting down and changing both the roll mill and the extruder die. This existing equipment is only capable of wrapping cylindrical or conical shapes of constant wall thickness. Tapered shapes must be wrapped with multiple layers, using excess material, and then finish-machined to the required wall thickness.

The utility and usefulness of this basic concept would be expanded exponentially if the shape of the strip could be varied during continuous equipment operations. The ability to vary strip shape would permit elimination of the very expensive final machining operations and permit the manufacture by wrapping of net, close tolerance, tapered wall thickness, rubber components that are surfaces of revolution—cylinders, domes, cones, etc. Conventionally, the strip is wrapped onto a surface of revolution comprising the surface of a rotating mandrel and it is most important that the strip nest properly with both the mandrel surface and with adjacent portions of the strip. This is a particularly crucial problem when wrapping over a curved surface, such as a dome, and where the insulation thickness must taper. If the strip is not the proper shape, it will not nest properly and the resulting layup will contain excessive voids, in the nature of space between the strips, resulting in unpredictable deformation during the curing step and loss of thickness control.

DISCLOSURE OF INVENTION

The invention comprises the use of a novel two roll forming mill which receives the rubber strip from the extruder. The forming mill is continuously adjustable during the wrapping procedure to vary the cross sectional shape (length and taper) of the wrapping strip.

BEST MODE FOR CARRYING OUT THE INVENTION

Figure 1A:
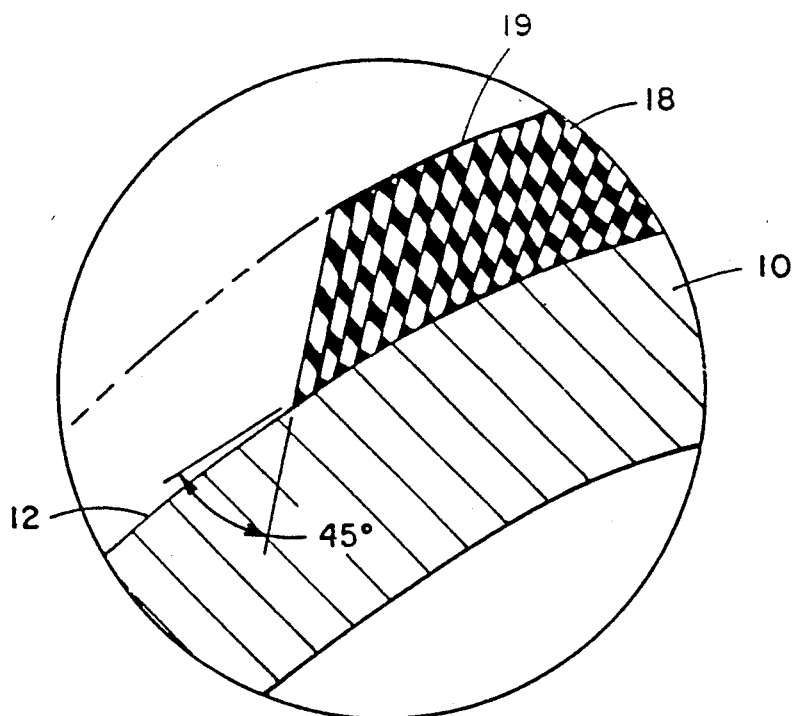
FIG. 1(a) is an enlarged segment of FIG. 1 showing the nesting of the insulation wrapping strip.
Figure 1:
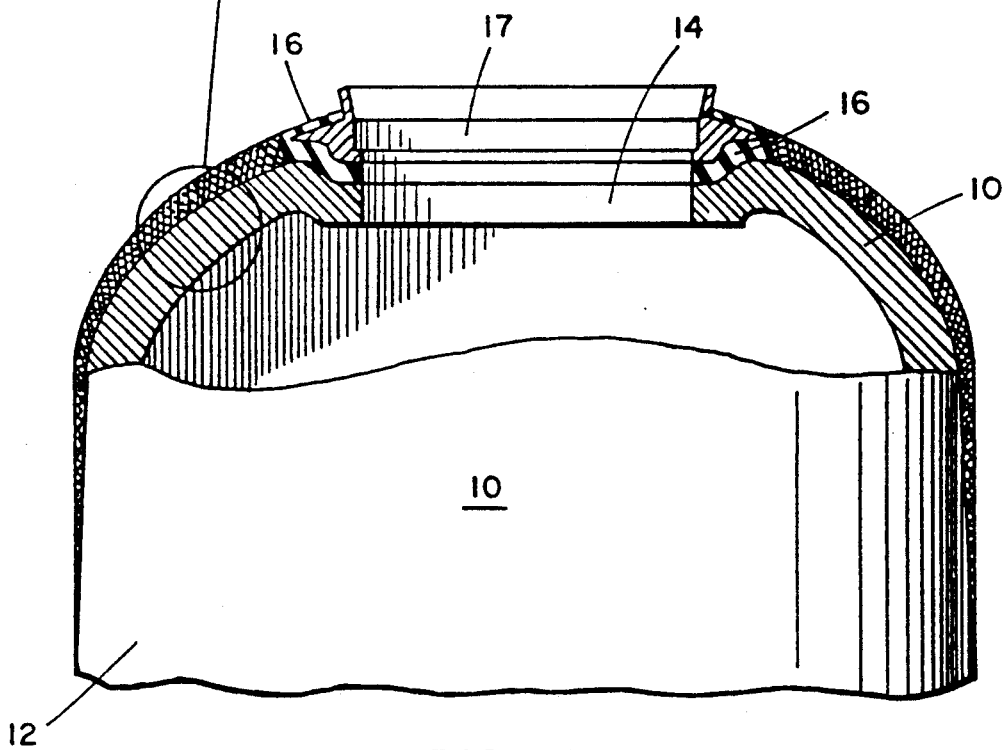
FIG. 1 is a partial cross-sectional view of a wrapping mandrel with an insulation strip wrapped thereon.

With particular reference to the drawings, there is illustrated in FIG. 1 a wrapping mandrel 10 which has an outer surface 12 which corresponds to the shape of the rocket motor casing adjacent the port area. A circular opening 14 on the mandrel corresponds to the nozzle or igniter attack port of a rocket motor casing. A preformed rubber starting ring 16 encircles the mandrel 10 adjacent the port opening 14 and carries a metal ring 17. The outer surface of the mandrel 10 is coated with a suitable release material such as Teflon.

In accordance with the present invention, a strip 18 of rubber insulation is wrapped upon the outer surface 12 of the rotating mandrel 10, beginning at the rubber starting ring 16. In order to achieve proper nesting and absence of voids, the strip 18 is to be wrapped upon the mandrel surface 12 at a predetermined constant angle, such as the 45° angle illustrated in FIG. 1(a). It is desired to follow the curving outer surface 12, to nest the successive turns closely adjacent one another, and to have a smooth outer surface—all without introducing undesirable voids. This obviously requires that the cross-section of the strip 18 be tapered (wider at the outer surface than at the inner surface), that the inner edge of the strip 18 be angled at approximately 45° and that the outer edge of the strip 18 have a similar angle. Furthermore, as will be apparent from FIG. 1, the thickness of the rubber insulation coating is to vary from a maximum adjacent the rubber starting ring 16 and decrease as wrapping proceeds away from the port area. This, then, also requires that the width of the wrapping strip 18 be gradually reduced during the wrapping process.

Figure 2:
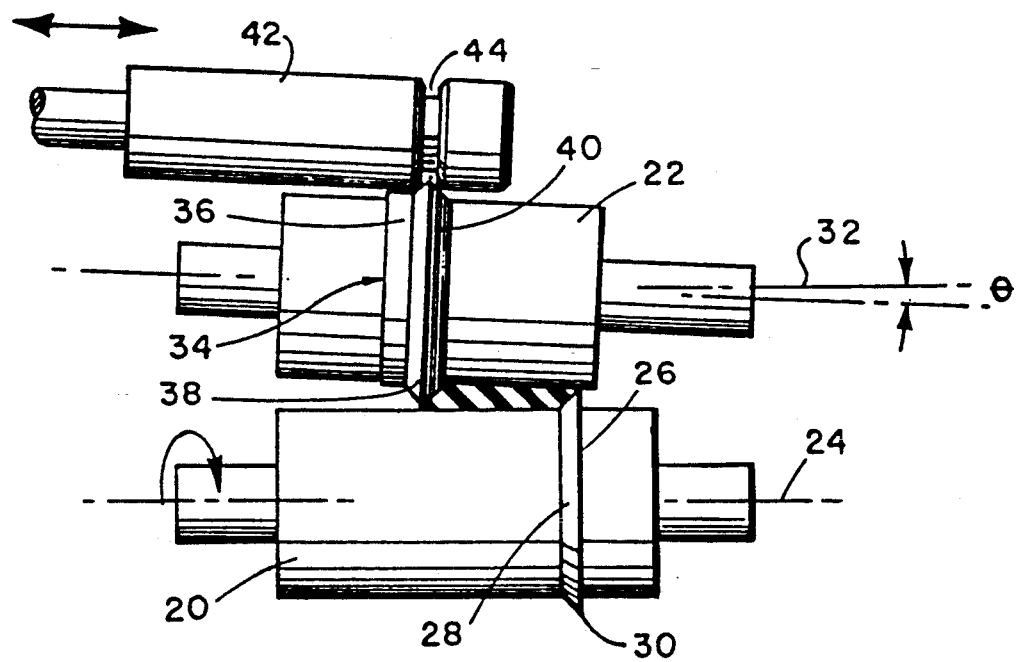
FIG. 2 is an elevational view of the adjustable forming mill of the invention.

The means by which the shape and size of the wrapping strip 18 are varied throughout the wrapping process is illustrated in FIG. 2. It is a forming mill comprising a fixed roller 20 and an adjustable roller 22. The fixed roller 20 may be driven by any suitable means and is mounted for rotation about a relatively fixed axis 24. Fixedly secured, or otherwise mounted, to the outer surface of the fixed roller 20 is a forming/trim ring 26. The inwardly facing surface 28 of the ring 26 has an angle corresponding to that desired for the inner edge of the wrapping strip 18. In the illustrated embodiment this angle is 45°. The outer radius of the ring 26 terminates at a sharp edge 30.

The adjustable roller 22 is mounted closely adjacent the fixed roller 20 for rotation about an adjustable axis 32. The adjustable axis 32 of adjustable roller 22 preferably lies in the same plane as the fixed axis 24 of the fixed roller 20. However, it is adjustable within that plane during the wrapping process through an angle Θ from an alignment parallel with axis 24. The angle Θ might be, for example, 3°.

Mounted on the outer surface of the adjustable roller 22, is a slide ring 34. As its name implies, slide ring 34 is not fixed relative to the outer surface of the adjustable roller 22, but is axially and controllably slidable along that surface. It comprises a slide collar 36 having a radially outwardly extending sharp edge 38 which has an angled inner surface 40. The angle of the inner surface 40 is substantially the same as that of the inner surface 28 of the forming/trim ring 26 on the fixed roller 20.

Any suitable means may be used to position the slide ring 34 during the wrapping procedure. One method, as shown in FIG. 2, comprises a rotatable idler push rod 42 which has a concentric groove 44 engaging and axially positioning the slidable forming/trim ring 34 on the surface of the roller 22. The movement of the push rod 42, as shown by the double ended arrow, may be programmed by any suitable means such as, for example, a cam.

Figure 3:
FIG. 3 is a cross-sectional view of the extruded insulation strip as it enters the forming mill.

The insulating strip, in the form of an uncured malleable material such as rubber is illustrated in FIG. 3 as strip 18a. It is essentially rectangular in cross-section. The adjustable roller 22 and the fixed roller 20 are positioned adjacent one another such that the forming/trim ring 26 engages the outer surface of the adjustable roller 22. Similarly, the sharp edge 38 of the slidable forming/trim ring 34 on the adjustable roller 22 is closely adjacent, but not in contact with, the outer surface of the fixed roller 20. Actual engagement of either of the sharp edges 30 or 38 with the surface of the adjacent roller is not desirable because it would mar the polished surface of the roller. When the axis 32 is tilted through the angle Θ, the adjustable roller 22 will pivot about a point near its outer surface which is adjacent to, but not contacting, the forming/trim ring 26.

Figure 4:
FIG. 4 illustrates the strip of FIG. 3 as it exits the forming mill.

The strip 18a is fed into the space between the fixed roller 20 and the adjustable roller 22 and within the region including the forming/trim ring 26 and the sharp edge 38. As the strip proceeds through this region, the excess flash 18b along the right edge of the strip, as viewed in FIG. 4, is trimmed away by the action of ring 26. The angle of the inner surface 28 of the ring leaves the strip 18 with an angled right edge. Similarly, the excess flash 18c along the left edge of the strip 18 is substantially separated by the action of sharp edge 38, leaving a similarly angled left edge. If necessary, a small cutoff wheel may be indexed to the slide ring 34 to complete the severing of flash 18c from the wrapping strip 18.

In operation, the control of the adjustable forming mill could be pre-programmed for the wrapping job to be accomplished. This would involve the preselection of the variation in strip taper produced by the tilt through the angle Θ of the roller axes, as required by the shape of the mandrel surface. It will be apparent that the invention is not limited to the production of a taper in only one direction. Obviously, the axis 32 of the adjustable roller could be rotated in either direction above or below the parallel with the fixed axis 24, in order to adapt to complex surface topographies. Similarly, the push rod 42, or other control means, would be programmed as required to produce strip widths varied as the need arises during the winding process. The final result is a layup without voids and with a smooth external surface 19 as illustrated in FIG. 1(a).

It will be seen that, by means of the novel forming mill of this invention, an uncured malleable wrapping strip may be produced which is continuously variable in shape and size for wrapping onto the surface of a mandrel or other rotating object having a variable curved surface. Furthermore, it will be apparent that the forming mill may be programmed and adjusted for any desired wrapping procedure. It will also be apparent that a number of modifications may be made in this invention without departing from its spirit and scope. Accordingly, the foregoing description is to be construed as illustrative only, rather than limiting. This invention is limited only by the scope of the following claims.

I claim:

1. The method of wrapping a strip of malleable material onto the surface of a relatively rotating body which comprises:
    passing said strip through a forming mill prior to applying it to said body, said forming mill comprising at least two rollers, at least one of said rollers having associated therewith at least one circumferential ring extending radially outwardly from said roller, said at least one ring being attached to the roller in such a manner that the ring and the roller move in tandem;
    adjusting said forming mill during the wrapping process such that said rollers and said at least one ring cooperate to vary the cross-sectional shape of the strip to conform to changes in the topography of the body.

2. The method of claim 1 wherein the variation in the cross-sectional shape is taper.

3. The method of claim 1 wherein the variation in the cross-sectional shape is width.

4. The method of claim 1 wherein the variation in the cross-sectional shape is both width and taper.

* * * * *